US00RE38826E

(19) United States
(12) Reissued Patent
Nakashiba et al.

(10) Patent Number: US RE38,826 E
(45) Date of Reissued Patent: *Oct. 11, 2005

(54) APPARATUS FOR AND METHOD FOR POLISHING WORKPIECE

(75) Inventors: Masamichi Nakashiba, Mitaka (JP); Norio Kimura, Fujisawa (JP); Isamu Watanabe, Tokyo (JP); Kaori Yoshida, Tokyo (JP)

(73) Assignee: EBARA Corporation, Tokyo (JP)

( * ) Notice: This patent is subject to a terminal disclaimer.

(21) Appl. No.: 09/589,388

(22) Filed: Jun. 8, 2000

Related U.S. Patent Documents

Reissue of:
(64) Patent No.: 5,762,539
Issued: Jun. 9, 1998
Appl. No.: 08/807,463
Filed: Feb. 27, 1997

(30) Foreign Application Priority Data

Feb. 27, 1996 (JP) ..... 8-65315

(51) Int. Cl.[7] ..... B24B 1/00
(52) U.S. Cl. ..... 451/41; 451/5; 451/285
(58) Field of Search ..... 451/5, 53, 41, 451/286–289

(56) References Cited

U.S. PATENT DOCUMENTS

| | | | | |
|---|---|---|---|---|
| 4,373,991 A | | 2/1983 | Banks | |
| 5,486,129 A | | 1/1996 | Sandhu et al. | |
| 5,584,751 A | | 12/1996 | Kobayashi et al. | |
| 5,605,488 A | | 2/1997 | Ohashi et al. | |
| 5,643,053 A | | 7/1997 | Shendon | |
| 5,670,011 A | | 9/1997 | Togawa et al. | |
| 5,795,215 A | * | 8/1998 | Guthrie et al. | 451/286 |
| 5,908,530 A | | 6/1999 | Hoshizaki et al. | |
| 5,941,758 A | * | 8/1999 | Mack | 451/41 |
| 6,024,630 A | * | 2/2000 | Shendon et al. | 451/41 |

FOREIGN PATENT DOCUMENTS

| | | |
|---|---|---|
| JP | 401109966 | 4/1989 |
| JP | 401216768 | 8/1989 |
| JP | 404217456 | 8/1992 |
| JP | 6-333891 | 12/1994 |

OTHER PUBLICATIONS

U.S. Appl. No. 08/524,824, filed Sep. 7, 1995, Kimura et al., entitled Method and Apparatus for Polishing Workpiece, now Patent No. 5,651,754.

U.S. Appl.No. 08/524,824, filed Sep. 27, 1995, Kimura et al., entitled "Method and Apparatus for Polishing Workpiece".*

* cited by examiner

*Primary Examiner*—George Nguyen
(74) *Attorney, Agent, or Firm*—Wenderoth, Lind & Ponack, L.L.P.

(57) ABSTRACT

A polishing apparatus for polishing a workpiece such as a semiconductor wafer has a turntable with a polishing surface, and a top ring for holding a workpiece and pressing the workpiece against the polishing surface under a first pressing. The polishing apparatus has a pressurized fluid source for supplying pressurized fluid, and a plurality of openings provided in the holding surface of the top ring for ejecting the pressurized fluid supplied from the pressurized fluid source. A plurality of areas each having the openings are defined on the holding surface so that the pressurized fluid is selectively ejectable from the openings in the respective areas.

54 Claims, 9 Drawing Sheets

$F_1 > F_2$ $F_1 \fallingdotseq F_2$ $F_1 < F_2$

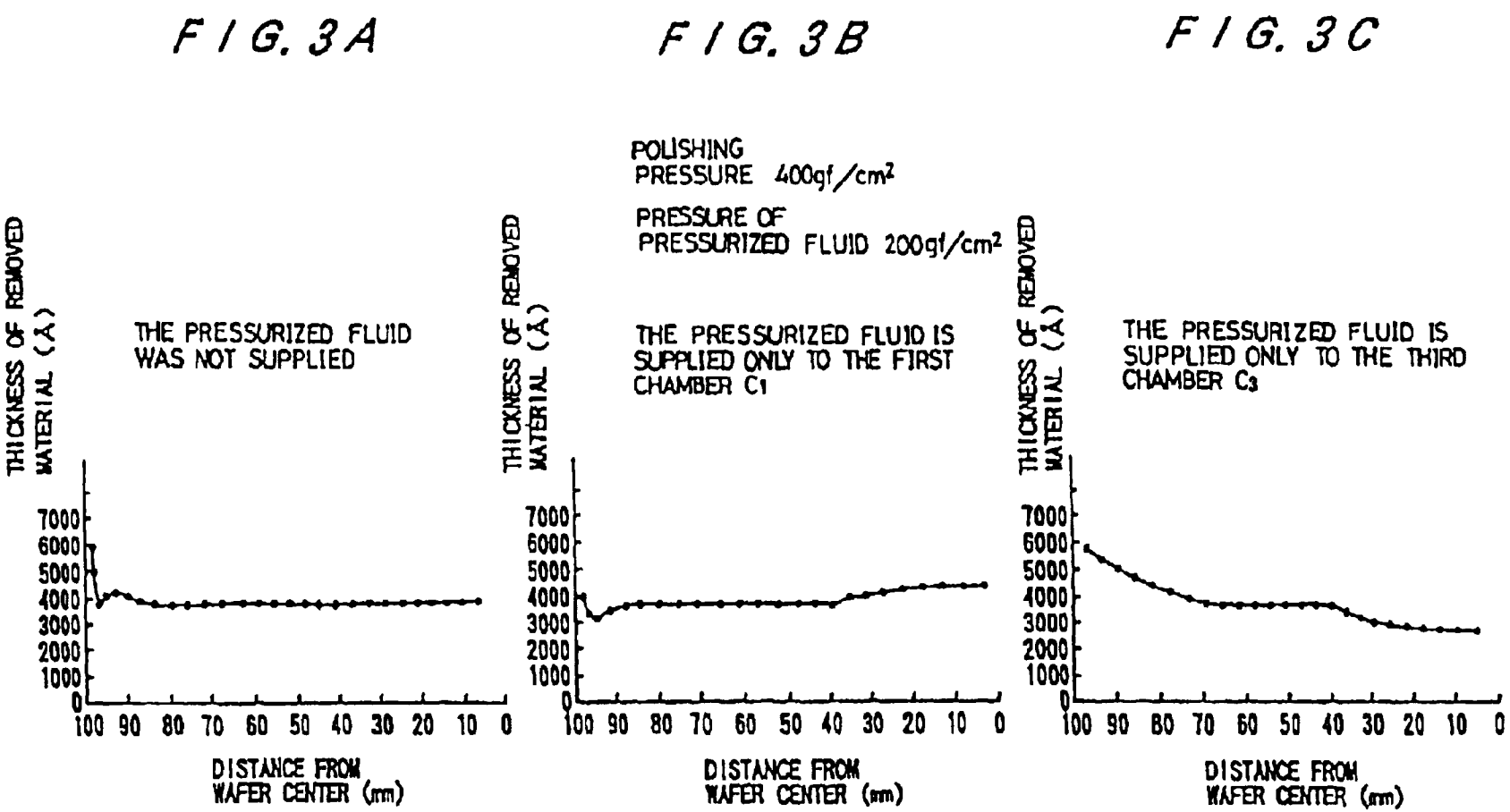
FIG. 3A
THE PRESSURIZED FLUID WAS NOT SUPPLIED
THICKNESS OF REMOVED MATERIAL (Å)
7000
6000
5000
4000
3000
2000
1000
0
100 90 80 70 60 50 40 30 20 10 0
DISTANCE FROM WAFER CENTER (mm)
FIG. 3B
POLISHING PRESSURE 400gf/cm²
PRESSURE OF PRESSURIZED FLUID 200gf/cm²
THE PRESSURIZED FLUID IS SUPPLIED ONLY TO THE FIRST CHAMBER C1
THICKNESS OF REMOVED MATERIAL (Å)
7000
6000
5000
4000
3000
2000
1000
0
100 90 80 70 60 50 40 30 20 10 0
DISTANCE FROM WAFER CENTER (mm)
FIG. 3C
THE PRESSURIZED FLUID IS SUPPLIED ONLY TO THE THIRD CHAMBER C3
THICKNESS OF REMOVED MATERIAL (Å)
7000
6000
5000
4000
3000
2000
1000
0
100 90 80 70 60 50 40 30 20 10 0
DISTANCE FROM WAFER CENTER (mm)

APPARATUS FOR AND METHOD FOR POLISHING WORKPIECE

Matter enclosed in heavy brackets [ ] appears in the original patent but forms no part of this reissue specification; matter printed in italics indicates the additions made by reissue.

*REFERENCE TO RELATED APPLICATION*

*A continuation of the reissue application was filed May 13, 2002 and bears Ser. No. 10/142,980.*

BACKGROUND OF THE INVENTION

1. Field of the Invention

The present invention relates to an apparatus for and a method of polishing a workpiece such as a semiconductor wafer to a flat mirror finish, and more particularly to an apparatus for and a method of polishing a workpiece such as a semiconductor wafer which can control the amount of a material removed from a desired area of the workpiece by a polishing action.

2. Description of the Related Art

Recent rapid progress in semiconductor device integration demands smaller and smaller wiring patterns or interconnections and also narrower spaces between interconnections which connect active areas. One of the processes available for forming such interconnection is photolithography. Though the photolithographic process can form interconnections that are at most 0.5 $\mu$m wide, it requires that surfaces on which pattern images are to be focused by a stepper be as flat as possible because the depth of focus of the optical system is relatively small.

It is therefore necessary to make the surfaces of semiconductor wafers flat for photolithography. One customary way of flattening the surfaces of semiconductor wafers is to polish them with a polishing apparatus.

Conventionally, a polishing apparatus has a turntable and a top ring which rotate at respective individual speeds. A polishing cloth is attached to the upper surface of the turntable. A semiconductor wafer to be polished is placed on the polishing cloth and clamped between the top ring and the turntable. An abrasive liquid containing abrasive grains is supplied onto the polishing cloth and retained on the polishing cloth. During operation, the top ring exerts a certain pressure on the turntable, and the surface of the semiconductor wafer held against the polishing cloth is therefore polished to a flat mirror finish while the top ring and the turntable are rotating.

The polishing apparatus is required to have such performance that the surfaces of semiconductor wafers have a highly accurate flatness. Therefore, it is preferable that the lower end surface (the holding surface) of the top ring which holds a semiconductor wafer and the contact surface of the polishing cloth which is held in contact with the semiconductor wafer, and hence the surface of the turntable to which the polishing cloth is attached, have a highly accurate flatness, and those surfaces which are highly accurately flat have been used in the art. The lower surface of the top ring and the upper surface of the polishing cloth are parallel to each other as in the ordinal cases.

It is known that the polishing action of the polishing apparatus is affected not only by the configurations of the holding surface of the top ring and the contract surface of the polishing cloth, but also by the relative speed between the polishing cloth and the semiconductor wafer, the distribution of pressure applied to the surface of the semiconductor wafer which is being polished, the amount of the abrasive liquid on the polishing cloth, and the period of time when the polishing cloth has been used. It is considered that the surface of the semiconductor wafer can be highly accurately flat if the above factors which affect the polishing action of the polishing apparatus are equalized over the entire surface of the semiconductor wafer to be polished. The larger the size of the semiconductor wafer is, the more difficult the above factors are equalized.

However, some of the above factors can easily be equalized over the entire surface of the semiconductor wafer, but the other factors cannot be equalized. For example, the relative speed between the polishing cloth and the semiconductor wafer can easily be equalized by rotating the turntable and the top ring at the same rotational speed and in the same direction. However, it is difficult to equalize the amount of the abrasive liquid on the polishing cloth because of a centrifugal forces imposed on the abrasive liquid.

The above approach which tries to equalize all the factors affecting the polishing action, including the flatnesses of the lower end surface of the top ring and the upper surface of the polishing cloth on the turntable, over the entire surface of the semiconductor wafer to be polished poses limitations on efforts to make the polished surface of the semiconductor wafer flat, often resulting in a failure to accomplish a desired degree of flatness of the polished surface.

It has been customary to achieve a more accurate flatness by making the holding surface of the top ring concave or convex to develop a certain distribution of pressure on the surface of the semiconductor wafer for thereby correcting irregularities of the polishing action which are caused by an irregular entry of the abrasive liquid and variations in the period of time when the polishing cloth has been used.

However, various problems have arisen in the case where a specific configuration is applied to the holding surface of the top ring. Specifically, since the holding surface of the top ring is held in contact with the semiconductor wafer at all times, the holding surface of the top ring affects the polishing action continuously all the time while the semiconductor wafer is being polished. Because the configuration of the holding surface of the top ring has direct effect on the polishing action, it is highly complex to correct irregularities of the polishing action by intentionally making the holding surface of the top ring concave or convex, i.e., non-flat. If the holding surface of the top ring which has been made intentionally concave or convex is inadequate, the polished surface of the semiconductor wafer may not be made as flat as desired, or irregularities of the polishing action may not be sufficiently corrected, so that the polished surface of the semiconductor wafer may not be sufficiently flat.

In addition, inasmuch as the holding surface of the top ring is of substantially the same size as the surface of the semiconductor wafer to be polished, the holding surface of the top ring is required to be made irregular in a very small area. Because such surface processing is highly complex, it is not easy to correct irregularities of the polishing action by means of the configuration of the holding surface of the top ring.

The conventional polishing apparatuses, particularly those for polishing semiconductor wafers, are required to polish workpiece surfaces to higher flatness. There have not been available suitable means and apparatus for polishing workpieces to shapes which are intentionally not flat or for polishing workpieces such that desired localized areas of workpiece surfaces are polished to different degrees.

SUMMARY OF THE INVENTION

It is therefore an object of the present invention to provide a polishing apparatus which can easily correct irregularities of a polishing action on a workpieces such as a semiconductor wafer, and polish a workpiece with an intensive polishing action on a desired localized area thereof.

According to an aspect of the present invention, there is provided a polishing apparatus for polishing a surface of a workpiece comprising: a turntable having a polishing surface thereon; a top ring for supporting the workpiece to be polished and pressing the workpiece against the polishing surface under a first pressing force, the top ring having a holding surface for holding the workpiece; a pressurized fluid source for supplying pressurized fluid; a plurality of openings provided in the holding surface of the top ring for ejecting the pressurized fluid supplied from the pressurized fluid source, a plurality of areas each having the openings being defined in the holding surface so that the pressurized fluid is selectively ejectable from the openings in the respective areas.

According to another aspect of the present invention, there is provided a method of polishing a workpiece, comprising the steps of: holding a workpiece between a polishing surface of a turntable and a holding surface of a top ring disposed above the turntable; pressing the workpiece by the top ring against the polishing surface under a first pressing force; and ejecting pressurized fluid from openings in a plurality of areas in the holding surface of the top ring toward the workpiece held by the top ring, the pressurized fluid being selectively ejectable from the openings in the respective areas; and polishing the workpiece in such a state that a pressing force applied to the workpiece by the pressurized fluid is variable in a central portion and an outer circumferential portion of the workpiece, respectively.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIGS. 3A through 3C are graphs showing the results of an experiment in which a semiconductor wafer was polished based on the basic principles of the present invention;

DETAILED DESCRIPTION OF THE PREFERRED EMBODIMENTS

Figure 1:
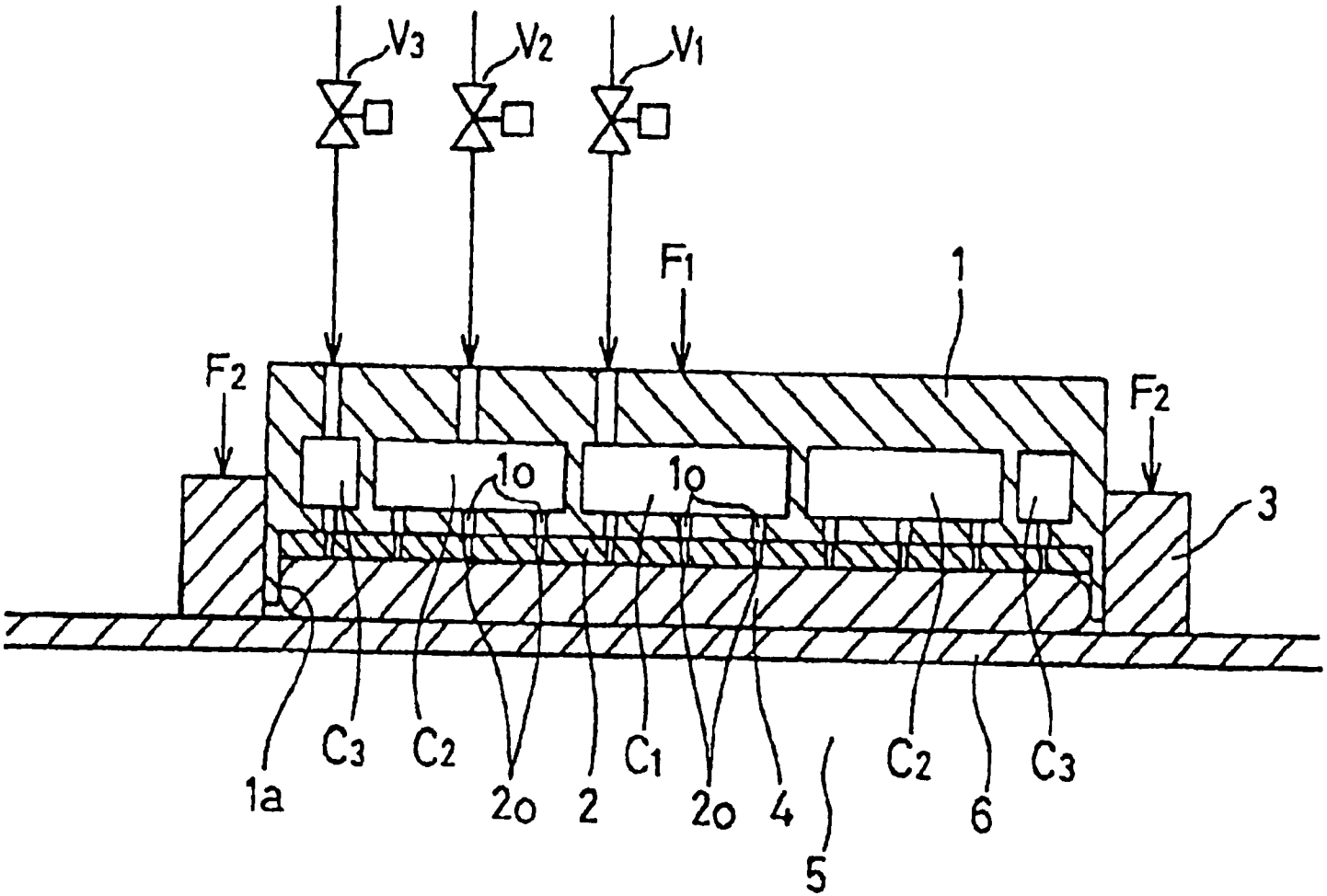
FIG. 1 is a fragmentary vertical cross-sectional view showing the basic principles of the present invention.

Like or corresponding parts are denoted by like or corresponding reference numerals throughout views.

FIG. 1 shows the basic principles of the present invention. As shown in FIG. 1, a top ring 1 has therein a circular first chamber $C_1$ at a central position thereof, an annular second chamber $C_2$ disposed at a radially outer side of the first chamber $C_1$, and an annular third chamber $C_3$ disposed at a radially outer side of the second chamber $C_2$. The first chamber $C_1$ is connected to a pressurized fluid source through a valve $V_1$, the second chamber $C_2$ is connected to a pressurized fluid source through a valve $V_2$, and the third chamber $C_3$ is connected to a pressurized fluid source through a valve $V_3$. The top ring 1 has a recess 1a defined in a lower surface thereof for accommodating therein a semiconductor wafer 4 which is a workpiece to be polished. An elastic pad 2 of polyurethane or the like is attached to the lower surface of the top ring 1.

The top ring 1 and the elastic pad 2 have a plurality of openings 1o and 2o, respectively, which are in registry with each other. Each of the openings 1o and 2o is communicated with anyone of the first chamber $C_1$, the second chamber $C_2$, and the third chamber $C_3$. That is, a plurality of openings each comprising the openings 1o and 2o for ejecting pressurized fluid are provided in a holding surface of the top ring 1 for holding the semiconductor wafer 4 to be polished. Thus, three concentric annular areas are defined on the holding surface of the top ring 1 by allowing the openings 1o and 2o to be communicated with anyone of the first, second and third chambers $C_1$, $C_2$ and $C_3$. The pressurized fluid is ejectable from the openings in the respective annular areas, separately.

A presser ring 3 is disposed around the top ring 1 and is vertically movable with respect to the top ring 1. A turntable 5 having an upper surface to which a polishing cloth 6 is attached is provided below the top ring 1. The top ring 1 applies a pressing force $F_1$ (pressure per unit area, gf/cm$^2$) to press the semiconductor wafer 4 against the polishing cloth 6 on the turntable 5, and the presser ring 3 applies a pressing force $F_2$ (pressure per unit area, gf/cm$^2$) to press the polishing cloth 6. These pressing forces $F_1$, $F_2$ are variable independently of each other.

During polishing, pressurized fluid such as compressed air is supplied to the first, second and third chambers $C_1$, $C_2$ and $C_3$, selectively, and the supplied pressurized fluid is ejected from the lower surface of the elastic pad 2 through the openings 1o and 2o and is supplied between the holding surface of the top ring 1 and the upper surface of the semiconductor wafer 4. At this time, at least one of the first, second and third chambers $C_1$, $C_2$ and $C_3$ to which pressurized fluid is supplied is selected, and hence at least one of the annular areas, from which pressurized fluid is ejected, in the holding surface of the top ring 1 is selected. For example, pressurized fluid is supplied only to the first chamber $C_1$, and is not supplied to the second and third chambers $C_2$ and $C_3$, and thus the pressurized fluid is ejected only from the central area of the holding surface of the top ring 1. As a result, the semiconductor wafer 4 is pressed against the polishing cloth 6 by the pressurized fluid in such a state that the polishing pressure applied to the central portion of the semiconductor wafer 4 is larger than the polishing pressure applied to outer circumferential portion of the semiconductor wafer 4. Thus, if the amount of a material removed from the outer circumferential portion of the semiconductor wafer 4 is larger than the amount of a material removed from the central portion of the semiconductor wafer 4, insufficient polishing action at the central portion of the semiconductor wafer can be corrected by utilizing the pressing action of the pressurized fluid.

On the other hand, if the amount of a material removed from the central portion of the semiconductor wafer 4 is larger than the amount of a material removed from the outer circumferential portion of the semiconductor waiter 4, the pressurized fluid is supplied only to the third chamber $C_3$, and is not supplied to the first and second chambers $C_1$ and $C_2$, and thus the pressurized fluid is ejected only from the outer circumferential area of the holding surface of the top ring 1.

As a result, the polishing pressure applied to the outer circumferential portion of the semiconductor wafer 4 is made larger than the central portion of the semiconductor wafer 4. Thus, insufficient polishing action at the outer circumferential portion of the semiconductor wafer can be collected, and the entire surface of the semiconductor wafer 4 can be uniformly polished.

The pressures of pressurized fluid supplied to the first chamber $C_1$, the second chamber $C_2$ and the third chamber $C_3$ are changed, respectively. That is, pressurized fluid having a pressure of $p_1$ gf/cm$^2$ is supplied to the first chamber $C_1$, pressurized fluid having a pressure of $P_2$ gf/cm$^2$ is supplied to the second chamber $C_2$, and pressurized fluid having a pressure of $p_3$ gf/cm$^2$ is supplied to the third chamber $C_3$, respectively. In this manner, the pressures of pressurized fluid ejected from the respective annular areas of the holding surface of the top ring 1 are varied, and the fluid which is supplied between the holding surface of the top ring 1 and the upper surface of the semiconductor wafer 4 has pressure gradient so as to be higher or lower progressively from the central area to the outer circumferential area of the semiconductor wafer 4, and hence the pressing force for pressing the semiconductor wafer 4 against the polishing cloth 6 has gradient so as to be higher or lower progressively from the central area to the outer circumferential area of the semiconductor wafer 4. Thus, irregularities of the polishing action can be sufficiently corrected, and the localized area of the semiconductor wafer 4 is prevented from being polished excessively or insufficiently.

In the present invention, the pressing force $F_1$ (pressure per unit area, gf/cm$^2$) for pressing the semiconductor wafer 4 against the polishing cloth 6, and the pressing force $F_2$ (pressure per unit area, gf/cm$^2$) for pressing the polishing cloth 6 are variable independently of each other. Therefore, the pressing force $F_2$ which is applied to the polishing cloth 6 by the presser ring 3 can be changed depending on the pressing force $F_1$ which is applied by the top ring 1 to press the semiconductor wafer 4 against the polishing cloth 6.

Theoretically, if the pressing force $F_1$ which is applied by the top ring 1 to press the semiconductor wafer 4 against the polishing cloth 6 is equal to the pressing force $F_2$ which is applied to the polishing cloth 6 by the presser ring 3, then the distribution of applied polishing pressures, which result from a combination of the pressing forces $F_1$, $F_2$, is continuous and uniform from the center of the semiconductor wafer 4 to its peripheral edge and further to an outer circumferential edge of the presser ring 3 disposed around the semiconductor wafer 4. Accordingly, the peripheral portion of the semiconductor wafer 4 is prevented from being polished excessively or insufficiently.

Figure 2A:
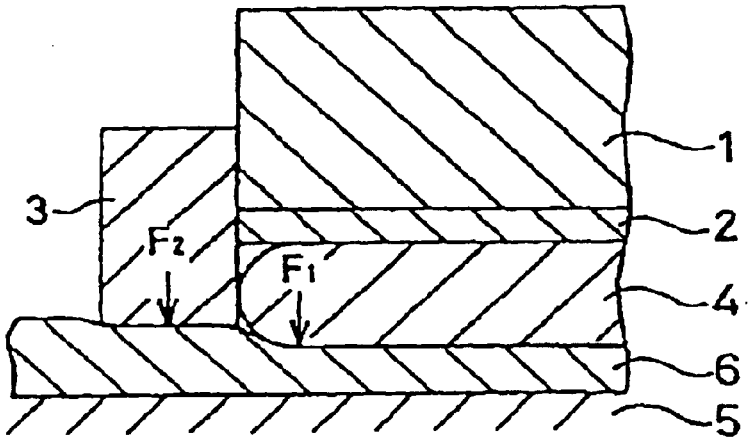
FIGS. 2A, 2B, and 2C are enlarged fragmentary vertical cross-sectional views showing the behavior of an polishing cloth when the relationship between a pressing force applied by a top ring and a pressing force applied by a presser ring is varied.
Figure 2B:
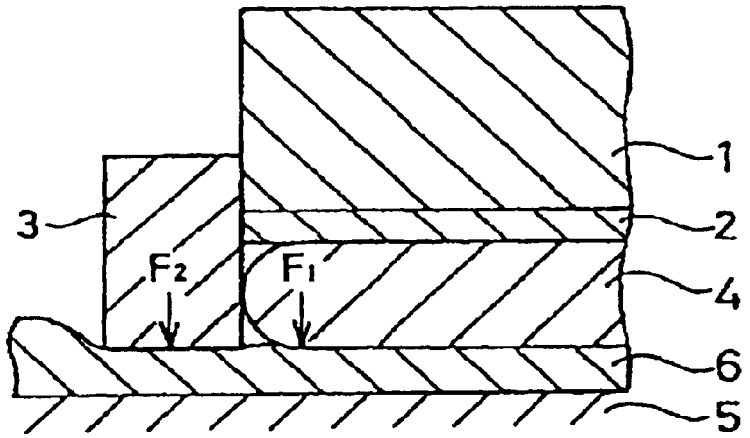
Figure 2C:
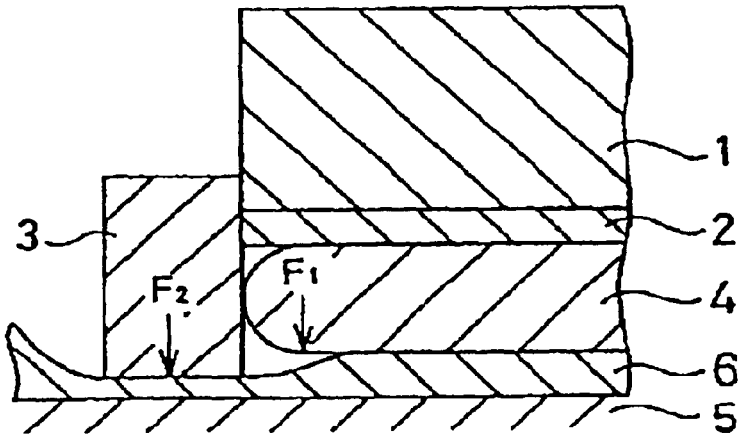

FIGS. 2A through 2C schematically show how the polishing cloth 6 behaves when the relationship between the pressing force $F_1$ and the pressing force $F_2$ is varied. In FIG. 2A, the pressing force $F_1$ is larger than the pressing force $F_2$ ($F_1>F_2$). In FIG. 2B, the pressing force $F_1$ is nearly equal to the pressing force $F_2$ ($F_1 \approx F_2$). In FIG. 2C, the pressing force $F_1$ is smaller than the pressing force $F_2$ ($F_1<F_2$).

As shown in FIGS. 2A through 2C, when the pressing force $F_2$ applied to the polishing cloth 6 by the presser ring 3 is progressively increased, the polishing cloth 6 pressed by the presser ring 3 is progressively compressed, thus progressively changing its state of contact with the peripheral portion of the semiconductor wafer 4, i.e., progressively reducing its area of contact with the peripheral portion of the semiconductor wafer 4. Therefore, when the relationship between the pressing force $F_1$ and the pressing force $F_2$ is changed in various patterns, the distribution of polishing pressures on the semiconductor wafer 4 over its peripheral portion and inner region is also changed in various patterns.

As shown in FIG. 2A, when the pressing force $F_1$ is larger than the pressing force $F_2$ ($F_1>F_2$), the polishing pressure applied to the peripheral portion of the semiconductor wafer 4 is larger than the polishing pressure applied to the inner region of the semiconductor wafer 47 so that the amount of a material removed from the peripheral portion of the semiconductor wafer 4 is larger than the amount of a material removed from the inner region of the semiconductor wafer 4 while the semiconductor wafer 4 is being polished.

As shown in FIG. 2B, when the pressing force $F_1$ is substantially equal to the pressing force $F_2$ ($F_1 \approx F_2$), the distribution of polishing pressures is continuous and uniform from the center of the semiconductor wafer 4 to its peripheral edge and further to the outer circumferential edge of the presser ring 3, so that the amount of a material removed from the semiconductor wafer 4 is uniform from the peripheral edge to the inner region of the semiconductor wafer 4 while the semiconductor wafer 4 is being polished.

As shown in FIG. 2C, when the pressing force $F_1$ is smaller than the pressing force $F_2$ ($F_1<F_2$), the polishing pressure applied to the peripheral portion of the semiconductor wafer 4 is smaller than the polishing pressure applied to the inner region of the semiconductor wafer 4, so that the amount of a material removed from the peripheral edge of the semiconductor wafer 4 is smaller than the amount of a material removed from the inner region of the semiconductor wafer 4 while the semiconductor wafer 4 is being polished.

The pressing force F, and the pressing force $F_2$ can be changed independently of each other before polishing or during polishing.

As described above, according to the present invention, pressurized fluid is ejected from the holding surface of the top ring 1. At this time, the areas from which the pressurized fluid is ejected are suitably selected, and the pressing force applied to the semiconductor wafer 4 by the pressurized fluid is changed in the central portion and the outer circumferential portion of the semiconductor wafer 4, respectively, during polishing.

In parallel with the above process, the pressing force $F_2$ of the presser ring 3 disposed around the top ring 1 is determined on the basis of the pressing force $F_1$ of the top ring 1, and the semiconductor wafer 4 is polished while pressing the polishing cloth 6 by the presser ring 3 under the pressing force $F_2$ which has been determined. Further, the pressing force $F_2$ is determined on the basis of the pressure distribution which is applied to the semiconductor wafer 4 by the pressurized fluid, and the semiconductor wafer 4 is polished by a combination of an action caused by the pressurized fluid and an action caused by the presser ring 3. In this manner, insufficient polishing action in thus localized area (for example, the central area or the outer circumferential area) of the semiconductor wafer can be corrected, and the localized area of the semiconductor wafer is prevented from being polished excessively or insufficiently. In the case where the polishing pressure applied to the central portion of the semiconductor wafer 4 is made larger than the outer circumferential portion of the semiconductor wafer 4 by supplying the pressurized fluid, the pressing force $F_2$ of the presser ring 3 is made larger than the pressing force $F_1$ of the top ring 1. Conversely, in the case where the polishing pressure applied to the outer circumferential portion of the semiconductor wafer 4 is made larger than the central portion of the semiconductor wafer 4 by supplying the pressurized fluid, the pressing force $F_2$ of the presser ring 3 is made smaller than the pressing force $F_1$ of the top ring 1.

FIGS. 3A through 3C show the results of an experiment in which a semiconductor wafer was polished based on the basic principles of supply of pressurized fluid according to the present invention. The semiconductor wafer used in the experiment was an 8-inch semiconductor wafer. In the experiment, the pressing force (polishing pressure) applied to the semiconductor wafer by the top ring was a constant level of 400 gf/cm$^2$, and the supply of the pressurized fluid was controlled. FIG. 3A shows the case in which the pressurized fluid was not supplied. FIG. 3B shows the case in which the pressurized fluid is supplied only to the first chamber $C_1$, and FIG. 3C shows the case in which the pressurized fluid is supplied only to the third chamber $C_3$. The pressure of the pressurized fluid was 200 gf/cm$^2$. In each of FIGS. 3A through 3C, the horizontal axis represents a distance(mm) from the center of the semiconductor wafer, and the vertical axis represents a thickness (Å) of a material removed from a semiconductor wafer.

As shown in FIGS. 3A through 3C, the thickness of the removed material at the radial positions on the semiconductor wafer is affected by controlling the supply of the pressurized fluid. Specifically, when the pressurized fluid was not supplied, as shown in FIG. 3A, the peripheral portion of the semiconductor wafer was excessively polished. When the pressurized fluid is supplied only to the first chamber $C_1$ to press only the central portion of the semiconductor wafer by the pressurized fluid, as shown in FIG. 3B, the peripheral portion of the semiconductor wafer was not excessively polished and the central portion of the semiconductor wafer was slightly excessively polished. When the pressurized fluid was supplied only to the third chamber $C_3$ to press only the outer circumferential portion of the semiconductor wafer by the pressurized fluid, as shown in FIG. 3C, the outer circumferential portion of the semiconductor wafer was excessively polished and the central portion of the semiconductor wafer was polished insufficiently.

As described above, the experimental result shown in FIGS. 3A through 3E indicate that the amount of the material removed from the localized area of the semiconductor wafer can be adjusted by controlling supply of the pressurized fluid.

FIGS. 4A through 4E show the results of an experiment in which a semiconductor wafer was polished based on the basic principles of the present invention. The semiconductor wafer used in the experiment was an 8-inch semiconductor wafer. In the experiment, the pressing force (polishing pressure) applied to the semiconductor wafer by the top ring was a constant level of 400 gf/cm$^2$, and the pressing force applied by the presser ring was changed from 600 to 200 gf/cm$^2$ successively by decrements of 100 gf/cm$^2$. Specifically, the pressing force applied by the presser ring was 600 gf/cm$^2$ in FIG. 4A, 500 gf/cm$^2$ in FIG. 4B, 400 gf/cm$^2$ in FIG. 4C, 300 gf/cm$^2$ in FIG. 4D, and 200 gf/cm$^2$ in FIG. 4E. In each of FIGS. 4A through 4E, the horizontal axis represents a distance (mm) from the center of the semiconductor wafer, and the vertical axis represents a thickness (Å) of a material removed from the semiconductor wafer.

Figures 4A, 4B, 4C:
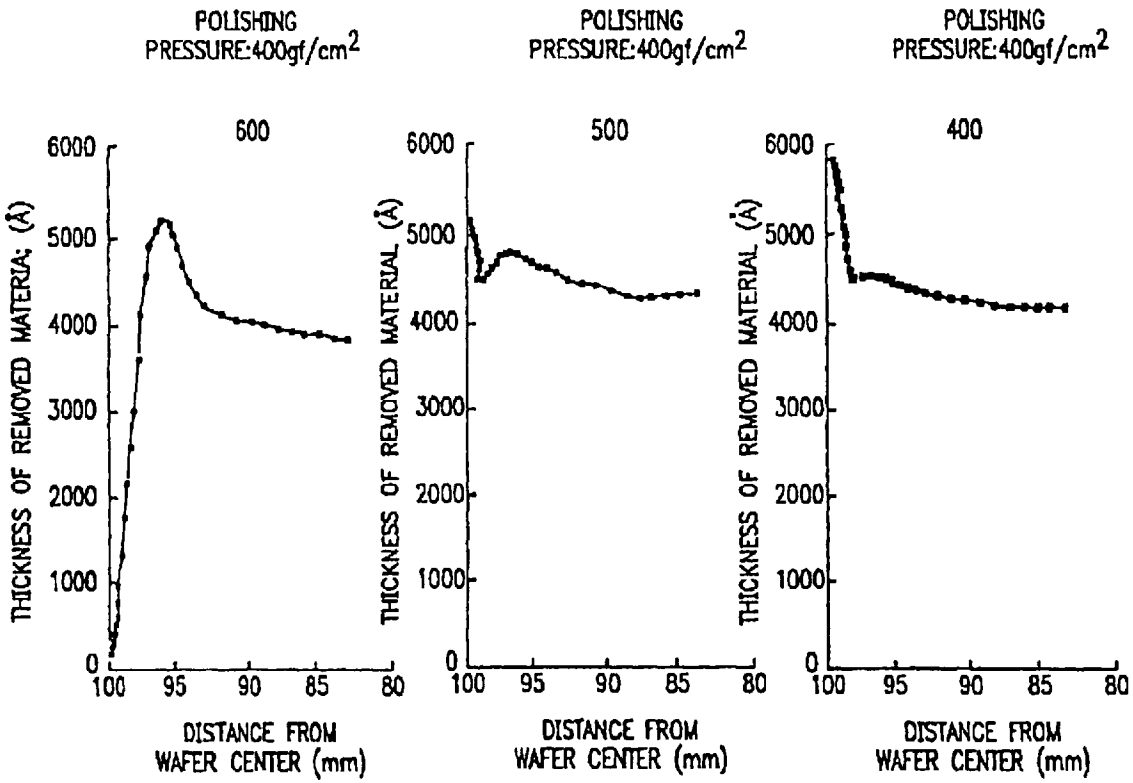
FIGS. 4A through 4E are graphs showing the results of an experiment in which a semiconductor wafer was polished based on the basic principles of the present invention.
Figures 4D, 4E:
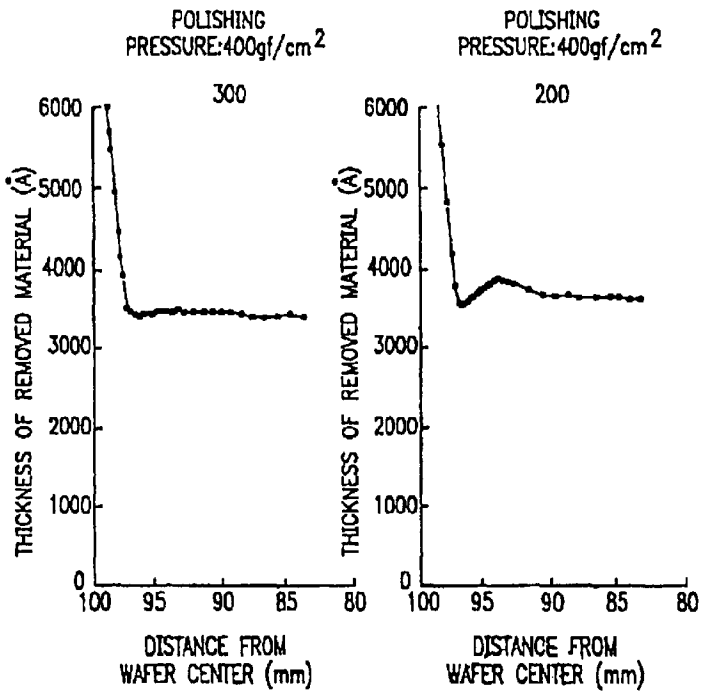

As shown in FIGS. 4A through 4E, the thickness of the removed material at the radial positions on the semiconductor wafer is affected when the pressing force applied by the presser ring was changed. Specifically, when the pressing force applied by the presser ring was in the range from 200 to 300 gf/cm$^2$ as shown in FIGS. 4D and 4E, the peripheral portion of the semiconductor wafer was excessively polished. When the pressing force applied by the presser ring was in the range from 400 to 500 gf/cm$^2$, as shown in FIGS. 4B and 4C, the peripheral portion of the semiconductor wafer is substantially equally polished from the peripheral edge to the inner region of the semiconductor wafer. When the pressing force applied by the presser ring was 600 gf/cm$^2{}_1$ as shown in FIG. 4A, the peripheral portion of the semiconductor wafer was polished insufficiently.

The experimental results shown in FIGS. 4A through 4E indicate that the amount of the material removed from the peripheral portion of the semiconductor wafer can be adjusted by varying the pressing force applied by the presser ring independently of the pressing force applied by the top ring. From a theoretical standpoint, the peripheral portion of the semiconductor wafer should be polished optimally when the pressing force applied by the presser ring is equal to the pressing force applied by the top ring. However, since the polishing action depends on the type of the semiconductor wafer and the polishing conditions, the pressing force applied by the presser ring is selected to be of an optimum value based on the pressing force applied by the top ring depending on the type of the semiconductor wafer and the polishing conditions.

There are demands for the removal of a larger or smaller thickness of material from the peripheral portion of the semiconductor wafer than from the inner region of the semiconductor wafer depending on the type of the semiconductor wafer. To meet such demands, the pressing force applied by the presser ring is selected to be of an optimum value based on the pressing force applied by the top ring to intentionally increase or reduce the amount of the material removed from peripheral portion of the semiconductor wafer.

Figure 5:
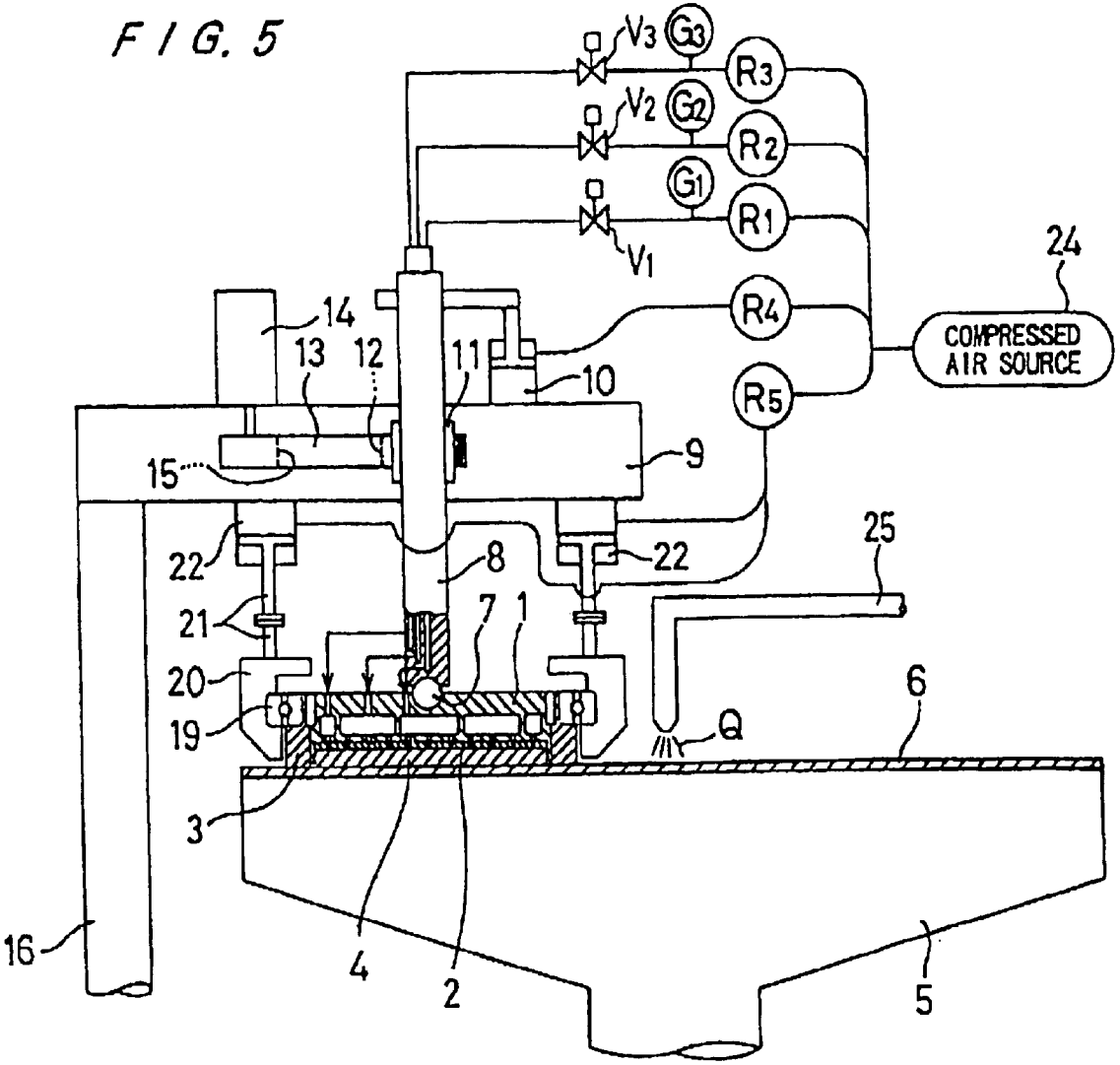
FIG. 5 is a vertical cross-sectional view of a polishing apparatus according to a first embodiment of the present invention.
Figure 6:
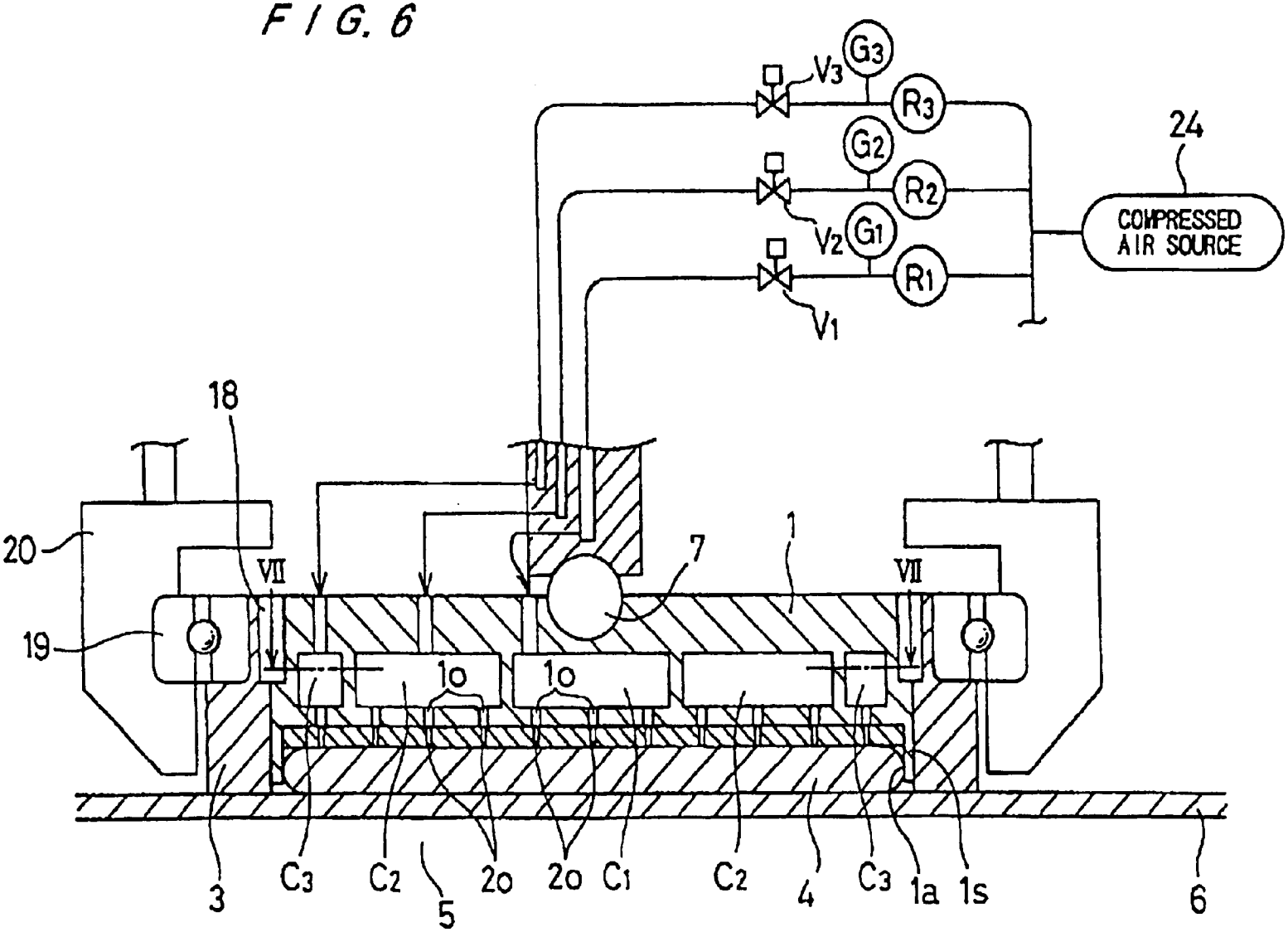
FIG. 6 is an enlarged vertical cross-sectional view showing details of a top ring and a presser ring of the polishing apparatus according to the first embodiment.
Figure 7:
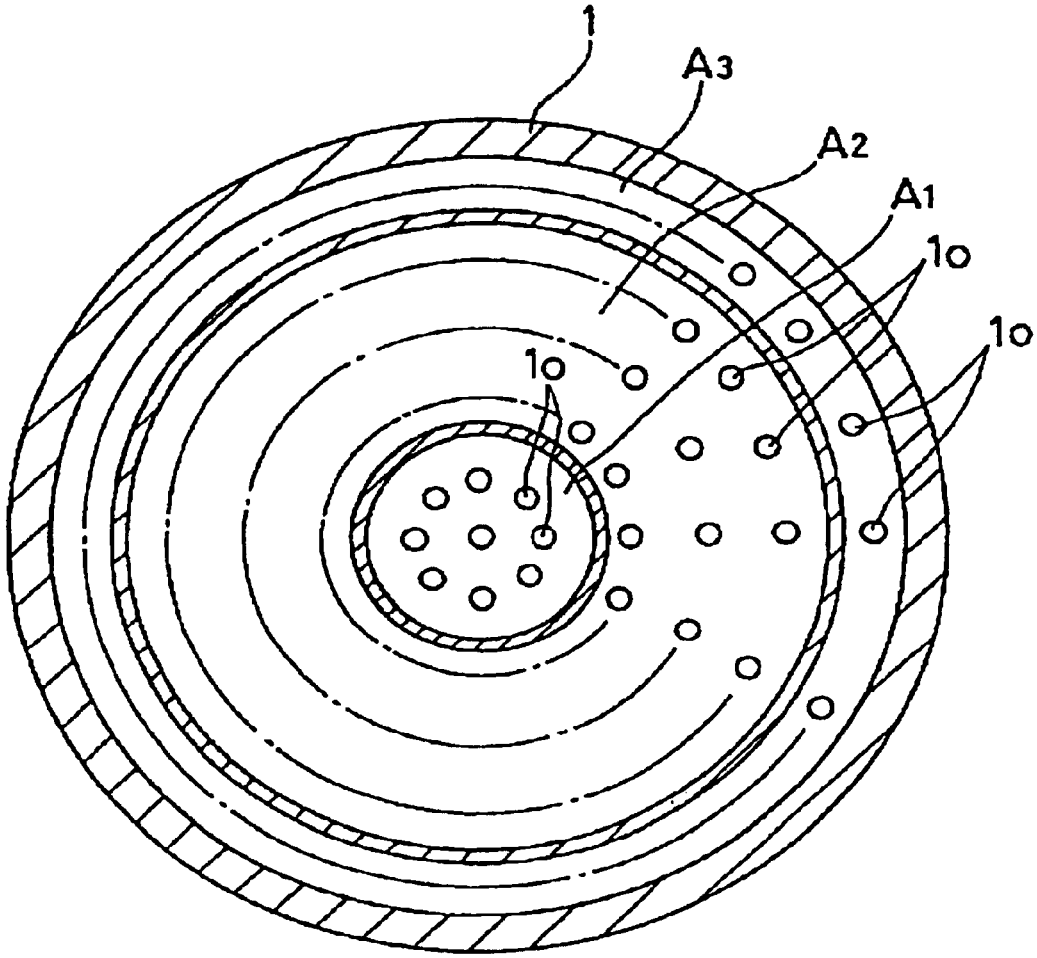
FIG. 7 is a cross-sectional view taken along line VII—VII of FIG. 6.

FIGS. 5 through 7 show a polishing apparatus according to a first embodiment of the present invention.

As shown in FIGS. 5 and 6, a top ring 1 has therein a circular first chamber $C_1$ at a central position thereof, an annular second chamber $C_2$ disposed at a radially outer side of the first chamber $C_1$, and an annular third chamber $C_3$ disposed at a radially outer side of the first chamber $C_2$. The first chamber $C_1$ is connected to a compressed air source 24 as a pressurized fluid source through a valve $V_1$ and a regulator $R_1$, the second chamber $C_2$ is connected to the compressed air source 24 through a valve $V_2$ and a regulator $R_2$, and the third chamber $C_3$ is connected to the compressed air source 24 through a valve $V_3$ and a regulator $R_3$. The top ring 1 has a recess 1a defined in a lower surface thereof for accommodating therein a semiconductor wafer 4 which is a workpiece to be polished. An elastic pad 2 of polyurethane or the like is attached to the lower surface of the top ring 1.

The top ring 1 and the elastic pad 2 have a plurality of openings 1o and 2o, respectively, which are in registry with each other. Each of the openings 1o and 2o is communicated with anyone of the first chamber $C_1$, the second chamber $C_2$, and the third chamber $C_3$. That is, a plurality of openings each comprising the openings 1o and 2o for ejecting pressurized fluid are defined on a holding surface of the top ring 1 for holding the semiconductor wafer 4 to be polished. Thus, three concentric annular areas $A_1$, $A_2$ and $A_3$ are defined in the holding surface of the top ring 1 by allowing the openings 1o and 2o to be communicated with anyone of the first, second and third chambers $C_1$, $C_2$ and $C_3$. The compressed air having different pressure from one another can be supplied to respective annular areas $A_1$, $A_2$ and $A_3$. Pressure gages or pressure sensors $G_1$, $G_2$ and $G_3$ are provided in the respective pressurized fluid supply lines, and the pressure in the respective chambers $C_1$, $C_2$ and $C_3$ can be independently controlled on the basis of the pressures detected by the pressure gages $G_1$, $G_2$ and $G_3$.

A presser ring 3 is disposed around the top ring 1 and is vertically movable with respect to the top ring 1. A turntable 5 with a polishing cloth 6 attached to an upper surface thereof is disposed below the top ring 1.

The top ring 1 is connected to a vertical top ring shaft 8 whose lower end is held against a ball 7 mounted on an upper surface of the top ring 1. The top ring shaft 8 is operatively coupled to a top ring air cylinder 10 fixedly mounted on an upper surface of a top ring head 9. The top ring shaft 8 is vertically movable by the top ring air cylinder 10 to press the semiconductor wafer 4 supported on the elastic pad 2 against the polishing cloth 6 on the turntable 5.

The top ring shaft 8 has an intermediate portion extending through and corotatably coupled to a rotatable cylinder 11 by a key (not shown), and the rotatable cylinder 11 has a pulley 12 mounted on outer circumferential surface thereof. The pulley 12 is operatively connected by a timing belt 13 to a timing pulley 15 mounted on the rotatable shaft of a top ring motor 14 which is fixedly mounted on the top ring head 9. Therefore, when the top ring motor 14 is energized, the rotatable cylinder 11 and the top ring shaft 8 are integrally rotated through the timing pulley 15, the timing belt 13 and the timing pulley 12. Thus the top ring 1 is rotated. The top ring head 9 is supported by a top ring head shaft 16 which is vertically fixed on a frame (not shown).

The presser ring 3 is corotatably, but vertically movably, coupled to the top ring 1 by a key 18. The presser ring 3 is rotatably supported by a bearing 19 which is mounted on a bearing holder 20. The bearing holder 20 is connected by vertical shafts 21 to a plurality of (three in this embodiment) circumferentially spaced presser ring air cylinders 22. The presser ring air cylinders 22 are secured to a lower surface of the top ring head 9.

The top ring air cylinder 10 and the presser ring air cylinders 22 are pneumatically connected to the compressed air source 24 through regulators $R_4$ and $R_5$, respectively. The regulator $R_4$ regulates an air pressure supplied from the compressed air source 24 to the top ring air cylinder 10 to adjust the pressing force which is applied by the top ring 1 to press the semiconductor wafer 4 against the polishing cloth 6. The regulator $R_5$ also regulates the air pressure supplied from the compressed air source 24 to the presser ring air cylinder 22 to adjust the pressing force which is applied by the presser ring 3 to press the polishing cloth 6. The regulators $R_4$ and $R_5$ are controlled by a controller (not shown in FIG. 5).

An abrasive liquid supply nozzle 25 is positioned above the turntable 5 for supplying an abrasive liquid Q onto the polishing cloth 6 on the turntable 5.

As shown in FIG. 6, the top ring 1 has an outer circumferential annular flange 1s extending downwardly toward the turntable 5. The lower surface of the top ring 1 and the annular flange is jointly define a recess 1a for accommodating the semiconductor wafer 4 therein.

The polishing apparatus shown in FIGS. 5, 6 and 7 operates as follows: The semiconductor wafer 4 to be polished is placed in the recess 1a and held against the elastic pad 2, and the top ring air cylinder 10 is actuated to lower the top ring 1 toward the turntable 5 until the semiconductor wafer 4 is pressed against the polishing cloth 6 on the upper surface of the rotating turntable 5. The top ring 1 and the presser ring 3 are rotated by the top ring motor 14 through the top ring shaft 8. Since the abrasive liquid Q is supplied onto the polishing cloth 6 by the abrasive liquid supply nozzle 25, the abrasive liquid Q is retained on the polishing cloth 6. Therefore, the lower surface of the semiconductor wafer 4 is polished with the abrasive liquid Q which is present between the lower surface of the semiconductor wafer 4 and the polishing cloth 6, During polishing, compressed air is supplied from the compressed air source 24 to the first, second and third chambers $C_1$, $C_2$ and $C_3$ selectively, and the supplied compressed air is ejected from the lower surface of the elastic pad 2 through the openings 1o and 2o, and is supplied between the holding surface of the top ring 1 and the upper surface of the semiconductor wafer 4. At this time, at least one of the chambers $C_1$, $C_2$ and $C_3$ to which compressed air is supplied is selected, and at least one of the annular areas $A_1$, $A_2$ and $A_3$ from which compressed air is ejected is selected. For example, compressed air is supplied only to the first chamber $C_1$, and is not supplied to the second and third chambers C, and $C_3$, whereby the semiconductor wafer 4 is pressed against the polishing cloth 6 by the compressed air in such a state that the polishing pressure applied to the central portion of the semiconductor wafer 4 is larger than the polishing pressure applied to outer circumferential portion of the semiconductor wafer 4. Thus, if the amount of a material removed from the outer circumferential portion of the semiconductor wafer 4 is larger than the amount of a material removed from the central portion of the semiconductor wafer 4, insufficient polishing action at the central portion of the semiconductor wafer can be corrected by utilizing the pressing action of the pressurized fluid.

On the other hand, if the amount of a material removed from the central portion of the semiconductor wafer 4 is larger than the amount of a material removed from the outer circumferential portion of the semiconductor wafer 4, the compressed air is supplied only to the third chamber $C_3$, and is not supplied to the first and second chambers $C_1$ and $C_2$, whereby the polishing pressure applied to the outer circumferential portion of the semiconductor wafer 4 is larger than the polishing pressure applied to the central portion of the semiconductor wafer 4. Thus, insufficient polishing action at the outer circumferential portion of the semiconductor wafer can be corrected, and the entire surface of the semiconductor wafer 4 can be uniformly polished.

The pressures of compressed air supplied to the first chamber $C_1$, the second chamber $C_2$ and the third chamber $C_3$ are changed respectively, that is, compressed air having a pressure of $p_1$ gf/cm$^2$ is supplied to the first chamber $C_1$, compressed air having a pressure of $P_2$ gf/cm$^2$ is supplied to the second chamber $C_2$, and compressed air having a pressure of $p_3$ gf/cm$^2$ is supplied. In this manner, the compressed air which is supplied between the holding surface of the top ring 1 and the upper surface of the semiconductor wafer 4 has pressure gradient so as to be higher or lower progressively from the central area to the outer circumferential area of the semiconductor wafer 4. That is, the pressing force for pressing the semiconductor wafer 4 against the polishing cloth 6 has gradient from the central area to the outer circumferential area of the semiconductor wafer 4. Thus, irregularities of the polishing action can be sufficiently corrected and the localized area of the semiconductor wafer 4 is prevented from being polished excessively or insufficiently.

Further, in the present invention, depending on the pressing force applied by the top ring 1 actuated by the top ring air cylinder 10, the pressing force applied to the polishing cloth 6 by the presser ring 3 actuated by the presser ring air cylinders 22 is adjusted while the semiconductor wafer 4 is being polished. During the polishing process, the pressing force $F_1$ (see FIG. 1) which is applied by the top ring 1 to press the semiconductor wafer 4 against the polishing cloth 6 can be adjusted by the regulator $R_1$, and the pressing force $F_2$ which is applied by the presser ring 3 to press the polishing cloth 6 can be adjusted by the regulator $R_2$. Therefore, during the polishing process, the pressing force $F_2$ applied by the presser ring 3 to press the polishing cloth 6 can be changed depending on the pressing force $F_1$ applied by the top ring 1 to press the semiconductor wafer 4 against the polishing cloth 6. By adjusting the pressing force $F_2$ with respect to the pressing force $F_1$, the distribution of polishing pressures is made continuous and uniform from the center of the semiconductor wafer 4 to its peripheral edge and further to the outer circumferential edge of the presser ring 3 disposed around the semiconductor wafer 4. Consequently, the peripheral portion of the semiconductor wafer 4 is prevented from being polished excessively or insufficiently. The semiconductor wafer 4 can thus be polished to a high quality and with a high yield.

If a larger or smaller thickness of material is to be removed from the peripheral portion of the semiconductor wafer 4 than from the inner region of the semiconductor wafer 4, then the pressing force $F_2$ applied by the presser ring 3 is selected to be of a suitable value based on the pressing force $F_1$ applied by the top ring 1 to intentionally increase or reduce the amount of a material removed from the peripheral portion of the semiconductor wafer 4.

By controlling compressed air supplied to the first, second and third chambers $C_1$, $C_2$ and $C_3$, the semiconductor wafer 4 is polished by a combination of a pressing action caused by the compressed air and a pressing action caused by the presser ring 3. Thus, insufficient polishing action in the localized area (for example, the central area or the outer circumferential area) of the semiconductor wafer can be corrected. Further, the amount of the material removed from the localized areas (for example, the central area or the outer circumferential area) can be intentionally increased or decreased. In this case, in the case where the polishing pressure at the central portion of the semiconductor wafer 4 is made larger than the polishing pressure at the outer circumferential portion of the semiconductor wafer 4, the pressing force $F_2$ of the presser ring 3 is made larger than the pressing force $F_1$ of the top ring 1. Conversely, in the case where the polishing pressure at the outer circumferential portion of the semiconductor wafer 4 is made larger than the polishing pressure at the central portion of the semiconductor wafer 4, the pressing force $F_2$ of the presser ring 3 is made smaller than the pressing force $F_1$ of the top ring 1.

In this embodiment, since the semiconductor wafer 4 is accommodated in the recess 1a of the top ring 1 and protected by the annular flange 1s, the outer circumferential surface of the semiconductor wafer 4 at its peripheral edge is not rubbed by the presser ring 3 when the presser ring 3 is vertically moved with respect to the top ring 1. Therefore, the presser ring 3 as it is vertically moved with respect to the top ring 1 does not adversely affect the polishing performance of the polishing apparatus during the polishing process.

Figure 8:
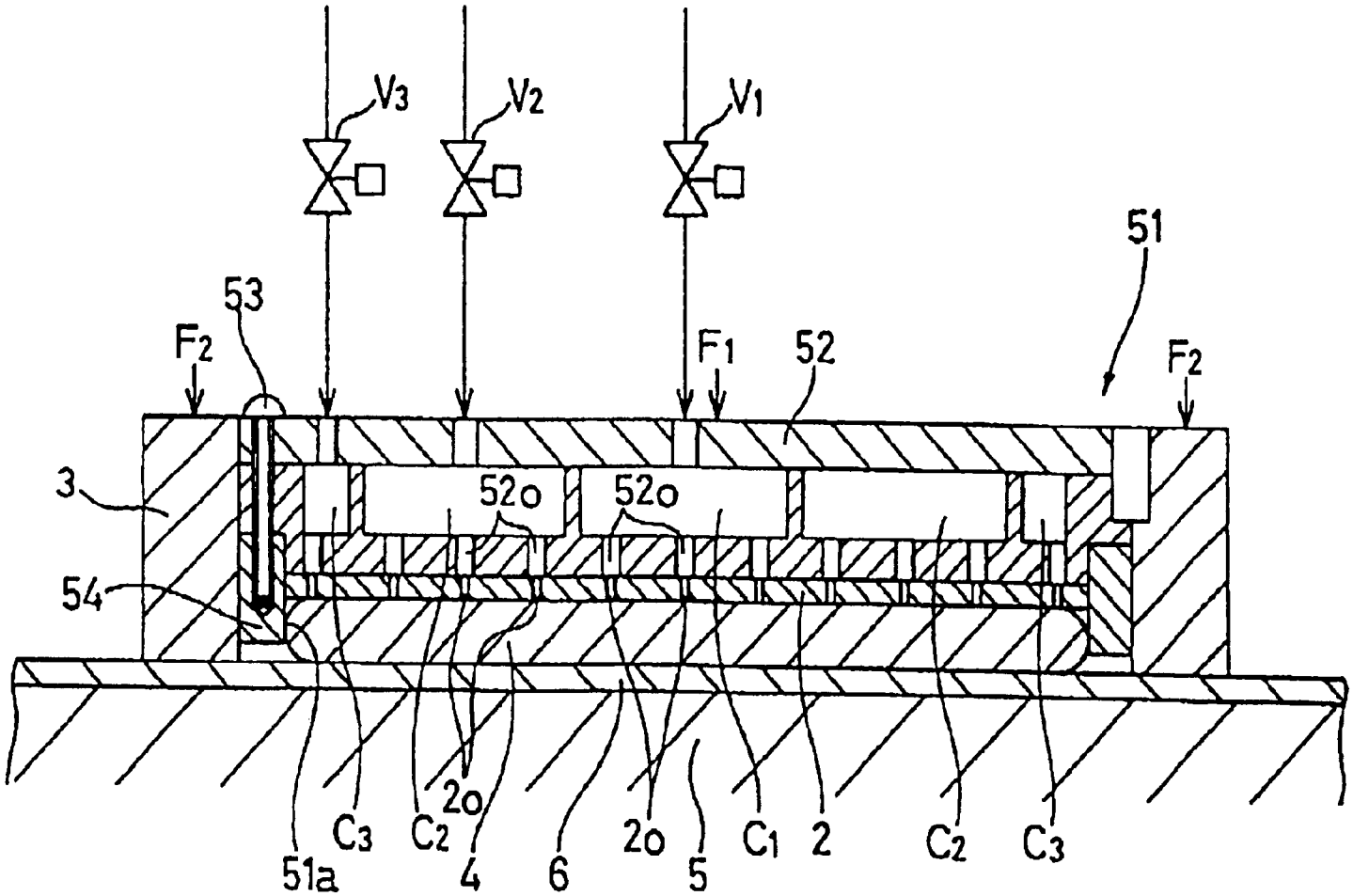
FIG. 8 is an enlarged vertical cross-sectional view of a polishing apparatus according to a second embodiment of the present invention.

FIG. 8 shows a polishing apparatus according to a second embodiment of the present invention. As shown in FIG. 8, a top ring 51 comprises a main body 52 and a ring member 54 detachably fixed by bolts 53 to a lower outer circumferential surface of the main body 52. The top ring 51 has a recess 51a for accommodating the semiconductor wafer 4. The recess 51a is defined by a lower surface of the main body 52 and an inner circumferential surface of the ring member 54. The semiconductor wafer 4 accommodated in the recess 51a has an upper surface held by the lower surface of the main body 52 and an outer circumferential surface held by the inner circumferential surface of the ring member 54. The presser ring 3 is vertically movably disposed around the top ring 51.

The main body 52 of the top ring 51 has therein a circular first chamber $C_1$ at a central position thereof, an annular second chamber $C_2$ disposed at a radially outer side of the first chamber $C_1$, and an annular third chamber $C_3$ disposed at a radially outer side of the first chamber $C_2$. The first chamber $C_1$, the second chamber $C_2$ and the third chamber $C_3$ are connected to the compressed air source (not shown) to allow compressed air to be supplied thereto in the same manner as the embodiment in FIGS. 5 through 7. The main body 52 of the top ring 51 has a plurality of openings 52o which are communicated with the first chamber $C_1$, the second chamber $C_2$ and the third chamber $C_3$, respectively. An elastic pad 2 also has a plurality of openings 2o which are in registry with the openings 52o. Thus compressed air can be applied to the upper surface of the semiconductor wafer 4.

While the workpiece to be polished according to the present invention has been illustrated as a semiconductor wafer, it may be a glass product, a liquid crystal panel, a ceramic product, etc. Further, as pressurized fluid, pressurized liquid may be used. The top ring and the presser ring may be pressed by hydraulic cylinders rather than the illustrated air cylinders. The presser ring may be pressed by electric devices such as piezoelectric or electromagnetic devices rather than the illustrated purely mechanical devices.

As described above, the present invention offers the following advantages:

The distribution of the pressing force of the workpiece is prevented from being nonuniform at the peripheral portion of the workpiece during the polishing process, and the polishing pressures can be uniformized over the entire surface of the workpiece. Therefore, the peripheral portion of the semiconductor wafer is prevented from being polished excessively or insufficiently. The entire surface of workpiece can thus be polished to a flat mirror finish. In the case where the present invention is applied to semiconductor manufacturing processes, the semiconductor devices can be polished to a high quality. Since the peripheral portion of the semiconductor wafer can be used as products, yields of the semiconductor devices can be increased.

In the case where there are demands for she removal of a larger or smaller thickness of material from the peripheral portion of the semiconductor wafer than from the inner region of the semiconductor wafer depending on the type of the semiconductor wafer, the amount of the material removed from the peripheral portion of the semiconductor wafer can be intentionally increased or decreased. Further, the amount of the material removed from not only the peripheral portion of the semiconductor wafer but also the localized area (for example, central portion or outer circumferential portion) can be intentionally increased or decreased.

Although certain preferred embodiments of the present invention have been shown and described in detail, it should be understood that various changes and modifications may be made therein without departing from the scope of the appended claims.

What is claimed is:

1. A polishing apparatus for polishing a surface of a workpiece comprising:

a turntable having a polishing surface thereon;

a top ring for supporting the workpiece to be polished and pressing the workpiece against said polishing surface under a first pressing force, said top ring having a holding surface for holding the workpiece;

a pressurized fluid source for supplying pressurized fluid;

a plurality of openings provided in said holding surface of said top ring for ejecting said pressurized fluid supplied from said pressurized fluid source, a plurality of areas each having said openings being defined in said holding surface so that said pressurized fluid is selectively ejectable from said openings in said respective areas.

2. An apparatus according to claim 1, wherein said plurality of areas comprises concentric annular areas.

3. An apparatus according to claim 1, wherein said plurality of areas are defined by communicating with a plurality of chambers, respectively formed in said top ring through said openings.

4. An apparatus according to claim 1, wherein said first pressing force and a pressure of said pressurized fluid are variable independently of each other.

5. An apparatus according to claim 1, wherein a pressure of said pressurized fluid is variable in each of said areas.

6. An apparatus according to claim 1, further comprising:

a presser ring vertically movably disposed around said top ring; and a pressing device for pressing said presser ring against said polishing surface under a second pressing force which is variable.

7. An apparatus according to claim 1, wherein said top ring has a recess defined therein for accommodating the workpiece therein.

8. A method of polishing a workpiece, comprising the steps of:

holding a workpiece between a polishing surface of a turntable and a holding surface of a top ring disposed above said turntable;

pressing the workpiece by said top ring against said polishing surface under a first pressing force; and ejecting pressurized fluid from openings in a plurality of areas in said holding surface of said top ring toward the workpiece held by said top ring, said pressurized fluid being selectively ejectable from said openings in said respective areas; and polishing the workpiece in such a state that a pressing force applied to the workpiece by said pressurized fluid is variable in a central portion and an outer circumferential portion of the workpiece, respectively.

9. A method according to claim 8, further comprising the step of:

pressing a presser ring vertically movably disposed around said top ring against said polishing surface around the workpiece under a second pressing force which is determined based on said first pressing force.

10. A method according to claim 8, said second pressing force is determined on the basis of a pressure distribution on the workpiece caused by said pressurized fluid ejected from said openings in said respective areas.

11. A top ring for supporting the workpiece to be polished, for use in a polishing apparatus, comprising:

a holding surface for holding the workpiece; and a plurality of openings, provided in said holding surface, from which pressurized fluid is ejected, a plurality of areas each having said openings being defined in said holding surface so that said pressurized fluid is selectively ejectable from said openings in said respective areas.

*12. A method of polishing a surface of a workpiece, comprising:*

*holding a workpiece by a top ring; and*

*pressing the workpiece against a polishing surface of a turntable to polish a surface of the workpiece by applying independently adjustable polishing pressures to substantially concentric circular areas of the workpiece, respectively, said polishing pressures including a first polishing pressure applied to a central circular area of the workpiece, a second polishing pressure applied to a first annular area of the workpiece located outside of the central circular area, and a third polishing pressure applied to a second annular area of the workpiece located outside of the first annular area.*

*13. A method according to claim 12, wherein said pressure is produced by air pressure.*

*14. A method according to claim 12, further comprising applying an adjustable pressure to a presser ring vertically movably disposed around said top ring for pressing said polishing surface.*

*15. A method according to claim 14, wherein said pressure applied to said presser ring is produced by air pressure.*

*16. A method according to claim 12, wherein the pressure applied to a central portion of the workpiece is larger than the pressure applied to an outer circumferential portion of the workpiece.*

*17. A method according to claim 12, wherein the pressure applied to an outer circumferential portion of the workpiece is larger than the pressure applied to a central portion of the workpiece.*

*18. A method of polishing a surface of a workpiece, the method comprising:*

*holding a workpiece with a top ring;*

*applying a first polishing pressure to a central portion of the workpiece;*

*applying a second polishing pressure to an outer circumferential portion of the workpiece, wherein the first polishing pressure is different than the second polishing pressure, and the first and second polishing pressures are independently adjustable; and*

*pressing a presser ring against a polishing surface under a pressing force which is variable.*

*19. The method as claimed in claim 18, wherein the first and second polishing pressures are produced by air pressure.*

*20. The method as claimed in claim 18, wherein the first and second polishing pressures are produced by pressurized fluid.*

*21. The method as claimed in claim 18, wherein the polishing pressure applied to the central portion of the workpiece is larger than the polishing pressure applied to the outer circumferential portion of the workpiece.*

*22. The method as claimed in claim 18, wherein the polishing pressure applied to the outer circumferential portion of the workpiece is larger than the polishing pressure applied to the central portion of the workpiece.*

*23. The method as claimed in claim 18, wherein the polishing pressures can be independently changed at different locations of the workpiece.*

*24. The method as claimed in claim 23, wherein the number of different locations where the polishing pressures can be independently changed includes at least three different locations.*

*25. A method of polishing a surface of a workpiece comprising:*

*holding a workpiece by a top ring;*

*pressing the workpiece by the top ring against a polishing surface;*

*supplying fluid pressures in a plurality of chambers formed in said top ring to provide polishing pressure to a central area and an outer circumferential area, wherein a radial width along a radius of said top ring of an outer one of said plurality of chambers is narrower than a radius of a central one of said plurality of chambers;*

*wherein said fluid pressures in said respective chambers are controllable independently of each other on the basis of the pressures detected by pressure sensors.*

*26. The method as claimed in claim 25, further comprising pressing a presser ring against the polishing surface.*

*27. The method as claimed in claim 26, wherein the pressing of the pressing ring is achieved by applying an adjustable pressure to the presser ring.*

*28. The method as claimed in claim 24, wherein the pressure applied to the presser ring is produced by air pressure.*

*29. A workpiece carrier for holding a workpiece and pressing the workpiece against a polishing surface, said workpiece carrier comprising:*

*a top ring for supporting the workpiece to be polished;*

*a pressing mechanism for pressing the workpiece against the polishing surface, said pressing mechanism being configured to apply a first polishing pressure to a central circular area of the workpiece and a second polishing pressure to an annular area of the workpiece that is outside of the central circular area, wherein the first polishing pressure and the second polishing pressure are controllable independently of each other; and*

*a presser ring vertically movably disposed around said top ring, said presser ring being pressed against a polishing surface under a pressing force which is variable.*

*30. The workpiece carrier as claimed in claim 29, wherein said pressing mechanism comprises at least two pressurized chambers to which pressurized fluid is supplied, said at least two pressurized chambers comprising a central circular chamber and a first annular chamber located outside of said central circular chamber,*

*said central circular chamber and said first annular chamber being positionable over the central circular area and the first annular area of the workpiece, respectively,*

*wherein said first polishing pressure and said second polishing pressure can be created by said pressurized fluid supplied to said central circular chamber and said first annular chamber, respectively.*

*31. The workpiece carrier as claimed in claim 29, wherein said first polishing pressure and said second polishing pressure are controllable independently of each other during polishing.*

*32. The workpiece carrier as claimed in claim 29, wherein said first polishing pressure and said second polishing pressure can be substantially uniformly applied to each of the central circular area and the first annular area of the workpiece.*

*33. The workpiece carrier as claimed in claim 30, wherein said first polishing pressure and said second polishing pressure are controllable by varying said pressurized fluid supplied to said central circular chamber and said first annular chamber, respectively.*

*34. The workpiece carrier as claimed in claim 30, wherein said pressurized fluid comprises pressurized air.*

*35. The workpiece carrier as claimed in claim 30, further comprising a second annular chamber located outside of said first annular chamber, wherein said second annular chamber can be positioned over a second annular area located outside of said first annular area of the workpiece so that a third polishing pressure, created by pressurized fluid supplied to said second annular chamber, can be applied to the second annular area of the workpiece.*

*36. The workpiece carrier as claimed in claim 35, wherein the pressurized fluid supplied to said second annular chamber comprises pressurized air.*

*37. A method for polishing a surface of a workpiece, the method comprising:*

*holding a workpiece by a top ring;*

*pressing the workpiece against a polishing surface by applying polishing pressure to the workpiece, said polishing pressure including a first polishing pressure applied to a central circular area of the workpiece and a second polishing pressure applied to a first annular area of the workpiece located outside of said central circular area, said first polishing pressure and said second polishing pressure being controllable independently of each other; and*

*pressing a presser ring against said polishing surface under a pressing force which is variable.*

*38. The method as claimed in claim 37, further comprising applying a third polishing pressure to a second annular area of the workpiece located outside of the first annular area of the workpiece, the third polishing pressure being controllable independently of the first and second polishing pressures.*

*39. A method for polishing a surface of a workpiece, the method comprising:*

*holding a workpiece by a top ring;*

*pressing the workpiece against a polishing surface by applying polishing pressure to the workpiece, the polishing pressure including a first polishing pressure applied to a central circular area of the workpiece and a second polishing pressure applied to a first annular area of the workpiece located outside of the central circular area of the workpiece,*

*the first polishing pressure and the second polishing pressure being controllable independently of each other; and*

*pressing an area of the polishing surface around the workpiece with a presser ring under a pressing force which is variable.*

*40. A method for polishing a surface of a workpiece, the method comprising:*

*holding a workpiece by a top ring; and*

*pressing the workpiece against a polishing surface by applying polishing pressure to the workpiece, the polishing pressure including a first polishing pressure applied to a central circular area of the workpiece, a second polishing pressure applied to a first annular area of the workpiece located outside of the central circular area, and a third polishing pressure applied to a second annular area of the workpiece located outside of the first annular area; and*

*pressing a presser ring against said polishing surface under a pressing force which is variable.*

*41. A polishing apparatus for polishing a surface of a workpiece, comprising:*

*a top ring for holding a workpiece, and*

*a plurality of chambers formed in said top ring, fluid pressures being supplied in said respective chambers to provide polishing pressure to a central area and an outer circumferential area, wherein a radial width along a radius of said top ring of an outer one of said plurality of chambers is narrower than a radius of a central one of said plurality of chambers.*

*42. A polishing apparatus according to claim 41, wherein said polishing pressure comprises a fluid pressure.*

*43. A polishing apparatus according to claim 41, wherein said polishing pressure comprises a compressed air pressure.*

*44. A polishing apparatus according to claim 41, wherein said central area and said outer circumferential area are formed by chambers formed in said top ring.*

*45. A polishing apparatus according to claim 41, further comprising:*

*a third area located between said central area and said outer circumferential area.*

*46. A polishing apparatus according to claim 41, further comprising:*

*a presser ring disposed around the workpiece and contacting a polishing surface for polishing the workpiece.*

*47. A polishing apparatus according to claim 46, wherein said presser ring is pressed by pressurized fluid.*

*48. A method for polishing a workpiece, comprising:*

*holding a workpiece on a surface of a top ring; and*

*applying a polishing pressure on a surface of the workpiece, wherein an area where said polishing pressure is applied is divided into at least a central area and an outer circumferential area of the workpiece, and a radial width along a radius of said top ring of the outer circumferential area is narrower than a radius of the central area.*

*49. A method according to claim 48, wherein said polishing pressure comprises a fluid pressure.*

*50. A method according to claim 48, wherein said polishing pressure comprises a compressed air pressure.*

*51. A method according to claim 48, wherein said central area and said outer circumferential area are formed by chambers formed in said top ring.*

*52. A method according to claim 48, wherein the area where said polishing pressure is applied is divided to said central area, said outer circumferential area and a third area located between said central area and said outer circumferential area.*

*53. A method according to claim 48, further comprising:*

*pressing a presser ring disposed around the workpiece against a polishing surface for polishing the workpiece.*

*54. A method according to claim 53, wherein said presser ring is pressed by pressurized fluid.*

* * * * *

UNITED STATES PATENT AND TRADEMARK OFFICE

CERTIFICATE OF CORRECTION

PATENT NO. : RE 38,826 E
DATED : October 11, 2005
INVENTOR(S) : Masamichi Nakashiba et al.

It is certified that error appears in the above-identified patent and that said Letters Patent is hereby corrected as shown below:

Column 15,
Line 36, change “24” to -- 27 --.

Signed and Sealed this

Seventh Day of March, 2006

JON W. DUDAS
*Director of the United States Patent and Trademark Office*